United States Patent [19]

Zylka et al.

[11] Patent Number: 5,134,888

[45] Date of Patent: Aug. 4, 1992

[54] ELECTRICAL DEVICES FOR MEASURING HYDRAULIC PRESSURE

[75] Inventors: Richard Zylka, Kamen-Methler; Robert S. Forsthovel, Ludinghausen; Arthur Manig, Werne, all of Fed. Rep. of Germany

[73] Assignee: Gewerkschaft Eisenhutte Westfalia GmbH, Fed. Rep. of Germany

[21] Appl. No.: 610,553

[22] Filed: Nov. 8, 1990

[30] Foreign Application Priority Data

Nov. 11, 1989 [DE] Fed. Rep. of Germany ....... 3937573

[51] Int. Cl.$^5$ .................... G01L 7/08; G01L 9/04
[52] U.S. Cl. ........................ 73/726; 73/720; 73/756; 338/4
[58] Field of Search ................ 73/756, 720, 721, 726, 73/727, DIG. 4; 338/4

[56] References Cited

U.S. PATENT DOCUMENTS

| | | |
|---|---|---|
| 3,289,134 | 11/1966 | Laimins ................... 338/4 |
| 4,017,819 | 4/1977 | Pien ........................ 338/4 |
| 4,325,260 | 4/1982 | Takahashi et al. ........ 73/726 |
| 4,939,497 | 7/1990 | Nishida et al. ........... 73/720 |

FOREIGN PATENT DOCUMENTS

| | | |
|---|---|---|
| 2239956 | 2/1974 | Fed. Rep. of Germany . |
| 2312078 | 9/1974 | Fed. Rep. of Germany . |
| 3231544 | 3/1984 | Fed. Rep. of Germany . |
| 3242297 | 5/1984 | Fed. Rep. of Germany . |
| 3303980 | 9/1984 | Fed. Rep. of Germany . |
| 3521794 | 1/1986 | Fed. Rep. of Germany . |
| 3601249 | 7/1987 | Fed. Rep. of Germany . |
| 0085325 | 4/1988 | Japan ....................... 73/720 |

OTHER PUBLICATIONS

DE-Zeitschrift Elektronik 1974, Heftlo, Band 23, Zeite 24.
DE-Zeitschrift Elektronik 1976, Haffi, Seite 24.

Primary Examiner—Donald O. Woodiel
Attorney, Agent, or Firm—Samuels, Gauthier & Stevens

[57] ABSTRACT

A cartridge forming a pressure measuring device is composed of main casing, a bushing detachably screwed to the casing and a coupling piece detachably screwed to the casing. The coupling piece has a plug which serves to establish hydraulic connection with some appliance to permit hydraulic fluid to act on a diaphragm configured as an integral thin wall of the coupling piece. A strain gauge sensor is mounted on the diaphragm and produces electrical signals on leads as the diaphragm deflects as a result of exposure to the pressure fluid. An amplifier serves to amplify the signals from the sensor for further processing and utilisation. The amplifier is mounted to the coupling piece with the aid of elongate conductive pins which also serve to connect the sensor leads to the amplifier.

9 Claims, 2 Drawing Sheets

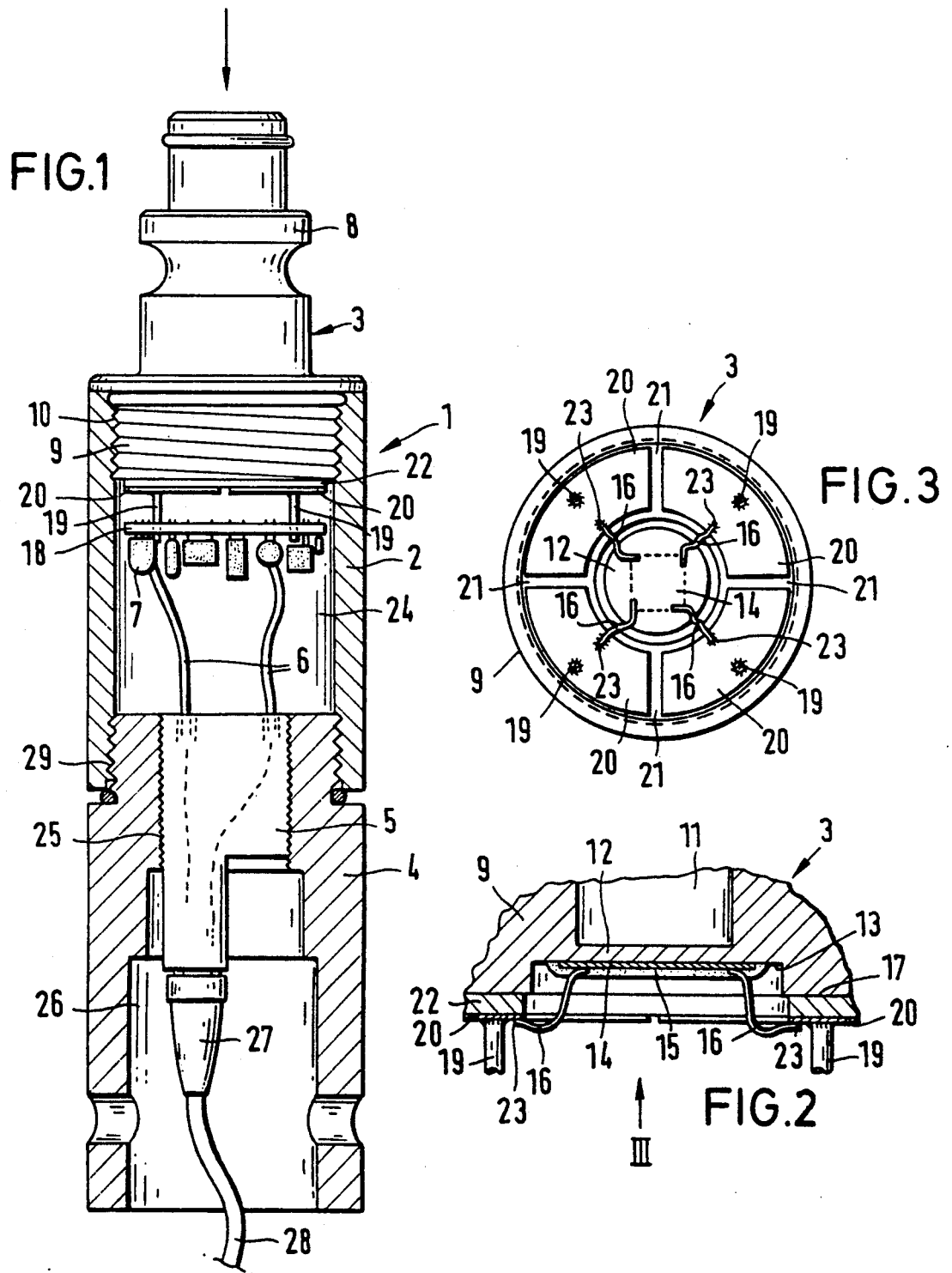

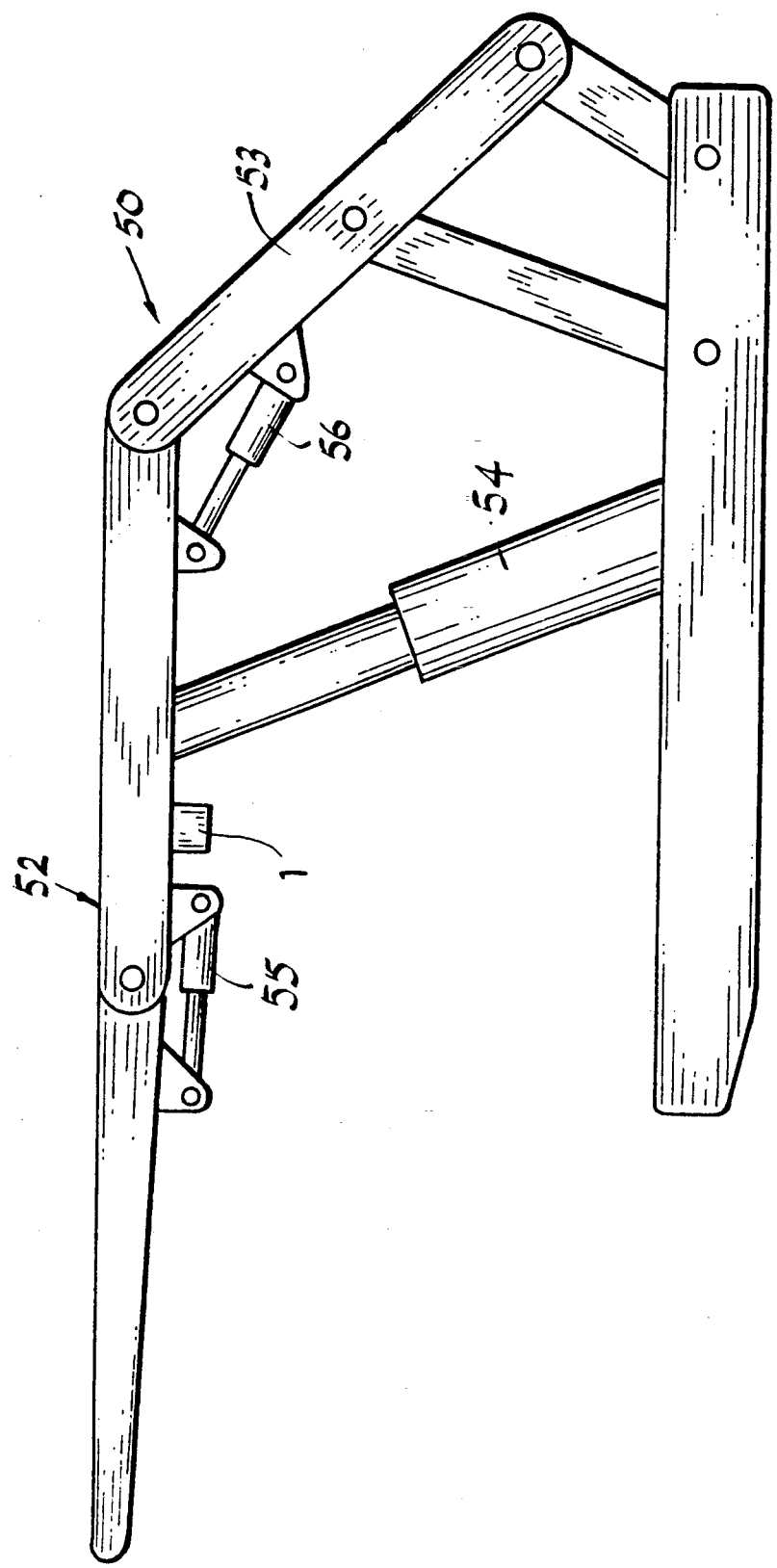

ELECTRICAL DEVICES FOR MEASURING HYDRAULIC PRESSURE

FIELD OF THE INVENTION

The present invention relates to a device for use in measuring or monitoring hydraulic pressure and, particularly, to a device usable with mining equipment.

BACKGROUND TO THE INVENTION

A device is known from DE-OS 3,601,249 which employs a metal diaphragm in a housing which is exposed to hydraulic pressure. A strain gauge sensor on the diaphragm provides an electrical signal dependent on the deformation of the diaphragm, and hence the pressure, and the signal is amplified and used as an output. The housing is provided at one end with a socket or plug pin for coupling directly to some appliance or unit containing hydraulic pressure fluid so that the device can be left in position to monitor or measure the prevailing hydraulic pressure. The known device is difficult to manufacture and assemble and a general object of the invention is to provide an improved device.

SUMMARY OF THE INVENTION

In a device of the kind known from DE-OS 3,601,249 the invention provides that the amplifier, e.g. a substrate or p.c board carrying electrical components constituting the amplifier, is fixed at a distance from the diaphragm with the aid of electrically conductive support elements which also serve to connect the electrical outputs from the sensor to the input of the amplifier.

The support elements can take the form of thin metal pins. The assembly of the device is considerably simplified by these measures since the electrical leads from the sensor do not have to be soldered to the comparatively inaccessible surface of the p.c board. Instead the leads or wires from the sensor need only be connected in an electrically conductive sense with the support elements. The housing is preferably of multi-part construction. The amplifier can thus be assembled separately and then secured to a coupling component of the housing which is provided with the diaphragm and the strain gauge sensor with the aid of the support elements which create a space between the p.c board and the diaphragm and the built-on sensor. The electrical connection between the sensor and the amplifier via the support elements can be established when the amplifier is being secured or after this has been done. With the amplifier fitted, the coupling component can be connected to a central casing of the housing, conveniently by screw-threads, with the diaphragm, the sensor and the amplifier all lying in a protected position in the casing.

The support elements may connected with flat metal discs or plates or feet which form terminals for the leads from the sensor. The leads from the sensor can be soldered to these terminals which provide a relatively large contact area. Instead of using soldered joints it is possible to clamp the ends of the leads with the terminals and to bond the leads with an adhesive. Preferably, the terminals engage on a flat end face of the coupling component and an insulating material is present between the terminals and the end face of the coupling component. An insulating ring or individual layers of insulating material, e.g. the adhesive, can be used for this purpose with the insulating material bonded to the end face of the coupling component. In an alternative method of assembly the support elements can be fixed with their terminals or feet to the end face of the coupling component and the connection with the wires from the sensor established and then the amplifier can be mounted onto the opposite ends of the support elements for example with soldered joints. Again, the support elements may have plates or the like at the ends adjacent the amplifier to form terminals to facilitate the connection. In a further modified design the support elements may terminate at one or both ends with plugs or sockets which mate with complementary sockets or plugs on the appropriate terminal structures.

Preferably, the diaphragm is a thin metal wall integral with the coupling component. This avoids further assembly which has hitherto involved welding the diaphragm in place and this in turn avoids buckling or warping of the diaphragm.

The coupling component can be provided with an external plug pin of the type widely used to establish hydraulic connection in mineral mining equipment. The whole device can thus be mounted into various appliances so that hydraulic pressure fluid can enter the device through the coupling component to act on the diaphragm.

The casing is preferably joined to a bushing of the housing at the end opposite the coupling component and this bushing may contain an electrical connector block which establishes connection between output leads from the amplifier and a cable leading out from the device.

The invention may be understood more readily, and various other aspects and features of the invention may become apparent, from consideration of the following description.

As appears hereinafter the invention provides a unitary device for measuring hydraulic pressure comprising a housing, a deformable diaphragm in the housing, means for establishing connection between hydraulic pressure fluid and the diaphragm, a strain gauge sensor mounted on the diaphragm to produce signals dependent on the pressure of the fluid acting on the diaphragm and an amplifier connected to the sensor to amplify said signals, wherein a plurality of conductive support elements serve to mount the amplifier at a distance from the diaphragm with output leads from the sensor being electrically connected to the amplifier via the support elements.

BRIEF DESCRIPTION OF DRAWINGS

An embodiment of the invention will now be described, by way of example only, with reference to the accompanying drawings, wherein:

FIG. 1 is a part-longitudinal-sectional view of a device constructed in accordance with the invention;

FIG. 2 is an enlarged sectional view of part of the device shown in FIG. 1;

FIG. 3 is a schematic end view of the device taken in the direction of arrow III in FIG. 1; and FIG. 4 is a side view of a mine roof support employing a device constructed in accordance with the invention.

DESCRIPTION OF PREFERRED EMBODIMENT

FIGS. 1 to 3 depict a device 1 constructed in accordance with the invention which is used to sense hydraulic pressure and to provide an electrical signal representing the sensed pressure. The device is intended for use with mining equipment and FIG. 4 depicts a typical application where a mine roof support 50 has a roof cap 52 on the underside of which the device 1 is installed. The support 50 has a floor sill 51, a goal shield 53 a telescopic hydraulic prop 54 and other hydraulic piston and cylinder units 55,56. The various appliances operated with hydraulic fluid would be connected via control valves to a pressure line and the device 1 is connected to this line to monitor the prevailing pressure. Turning now to FIGS. 1 to 3, the device 1 takes the form of a cylindrical cartridge composed of three main components namely a central casing 2 a coupling component 3 and a bushing 4. The components 2,3 and 4 are connected together with screw threads and more particularly the casing 2 has inner threaded portions 10,29 at its ends which mate with external threaded portions of the coupling piece 3 and the bushing 4. The bushing 4 contains an electrical connector block 5 which receives electrical leads 6 representing the output from an amplifier 7 mounted in the casing 2 and mates with an electrical connector 27 with a cable 28 leading out from the device.

The coupling piece 3 is an integral metal turning provided with a plug pin 8 projecting axially outwardly from the casing 2 and a portion 9 with screw threads engaging with the screw threads 10 of the casing 2. The plug pin 8 is conventional in the mining field and serves to engage with a socket to form a sealed connection with some hydraulic equipment such as a valve block connected to a conduit or the like conveying hydraulic pressure fluid. The coupling component 3 has an internal bore 11 (FIG. 2) which terminates within the screw-threaded portion 9 at a thin wall which provides a flexible diaphragm 12 which deforms and deflects according to the pressure of the hydraulic fluid in the bore 11. The lower surface 13 of the diaphragm 12 remote from the bore 11 supports a sensor 14 with one or more strain gauges which provides electrical signals dependent on the mechanical deformation of the diaphragm 12. The sensor 14 is secured to the surface 13 with an adhesive, and more preferably a coating of synthetic resin 15, which bonds and seals the sensor 14 to the surface 13. The sensor 14 is preferably composed of four individual strain gauges connected together in a Wheatstone bridge configuration. The four electrical signals from the sensor 14 are taken from the sensor with the aid of electrical wires 16 which can be bare wires. As shown in FIG. 2, the surface 13 of the diaphragm 12 which supports the sensor 14 is offset axially from the annular end face 17 of the screw threaded portion 9 of the coupling component 3 so that the sensor 14 is in a protected position accommodated in a shallow recess in the end of the coupling component 3. The amplifier 7 is composed of electrical components mounted on a substrate 8, such as a p.c. board 18 of circular shape, and is connected to receive the electrical signals on the wires 16 as inputs. The p.c board 18 is supported by four thin support elements 19 evenly spaced around the p.c. board. The elements 19 take the form of metallic electrically-conductive pins which also serve as electrical conductors for connecting the wires 16 to the amplifier 7. The elements 19 are connected with solder joints to the wires 16 on conductive plates 20 isolated from one another as individual terminals 23 (FIGS. 2 and 3). The terminals 23 are electrically insulated from the metallic coupling component 3 and the casing 2 with the aid of an insulating ring 22 which abuts on the end face 17 of the coupling piece 3. The ring 22 can be bonded to the face 17 with adhesive. In an alternative design, a plastics insulating compound is applied to the end face 17 to provide the insulation. The electrical connection between the sensor 14 and the amplifier 7 is thus provided by the wires 16, the terminals 23 and the elements 19.

The use of soldered joints to connect the elements 19 to the wires 16 is not essential and other forms of electrical connection can be used. For example, the wires 16 can be trapped beneath the plates 20 in contact therewith and then bonded with an adhesive with insulating properties to the end face 17. In another version the p.c. board 18 is plugged with the elements 19 into complementary sockets forming the terminals 23 electrically connected to the wires 16 or forming terminals on the p.c board 18. Conversely, the elements 19 can be fixed to the terminals 23 on the end face 17 and the elements 19 can plug into sockets on the p.c. board 18.

The coupling component 3 with its diaphragm 12, the sensor 14 and the amplifier 7 supported with the elements 19 collectively form a unit which is screwed into the casing 2 with the amplifier 7 and the sensor 14 occupying a protected position.

The bushing 4 which is screwed into the casing 2 from below closes off the interior of the casing 2. The connector block 5 mounted in the bushing 4 can itself be screwed into a threaded bore 25 in the bushing 4 or simply pushed in and clamped. The connector block 5 has plugs or sockets which mate with complementary sockets or plugs on the ends of cables 6 carrying output signals from the amplifier 7.

A recess 26 at the lower end of the bushing 4 accommodates a plug or socket connector 27 at the end of the cable 28 which mates with a complementary connector on the connector block 5.

We claim:

1. A unitary device for measuring hydraulic pressure comprising a housing of multi-part construction, said housing including a coupling component, said coupling component having an integral thin wall forming a deformable diaphragm and means for establishing connection between hydraulic pressure fluid and the diaphragm, said housing also including a casing which is detachably secured to said coupling component, a strain gauge sensor mounted on the diaphragm to produce signals dependent on the pressure of the fluid acting on the diaphragm, an amplifier mounted to said coupling component and connected to the sensor to amplify said signals, and a plurality of electrically conductive support elements which serve to mount the amplifier at a distance from the diaphragm with output leads from the sensor being electrically connected to the amplifier via the support elements.

2. A device according to claim 1, wherein the support elements take the form of thin metal pins.

3. A device according to claim 1, wherein the support elements have plates forming terminals adjacent the diaphragm and the leads from the sensor are electrically connected to the terminals.

4. A device according to claim 3, wherein the plates are thin metal discs or rings.

5. A device according to claim 1, wherein the support elements engage with an end face of the coupling component and means providing electrical insulation is disposed to insulate the support elements from the coupling component.

6. A device according to claim 5, wherein the support elements have plates forming terminals adjacent the end face of the coupling component and the terminals are insulated and bonded to the end face with adhesive.

7. A device according to claim 1, wherein the casing and the coupling components are in screw-threaded engagement and the sensor and amplifier are disposed in a protected position within the casing and the coupling component.

8. A device according to claim 1, wherein the amplifier is composed of electrical components mounted on a p.c. board and the support elements are also mounted to the p.c. board.

9. A device according to claim 1, wherein the housing further comprises a bushing detachably secured to the casing at an end region remote from the coupling component and an electrical connector block is provided in the bushing for receiving output leads from the amplifier and a cable leading from the device.

* * * * *